No. 751,958. PATENTED FEB. 9, 1904.
I. H. SPENCER.
VARIABLE SPEED DEVICE.
APPLICATION FILED SEPT. 12, 1902.
NO MODEL. 2 SHEETS—SHEET 1.
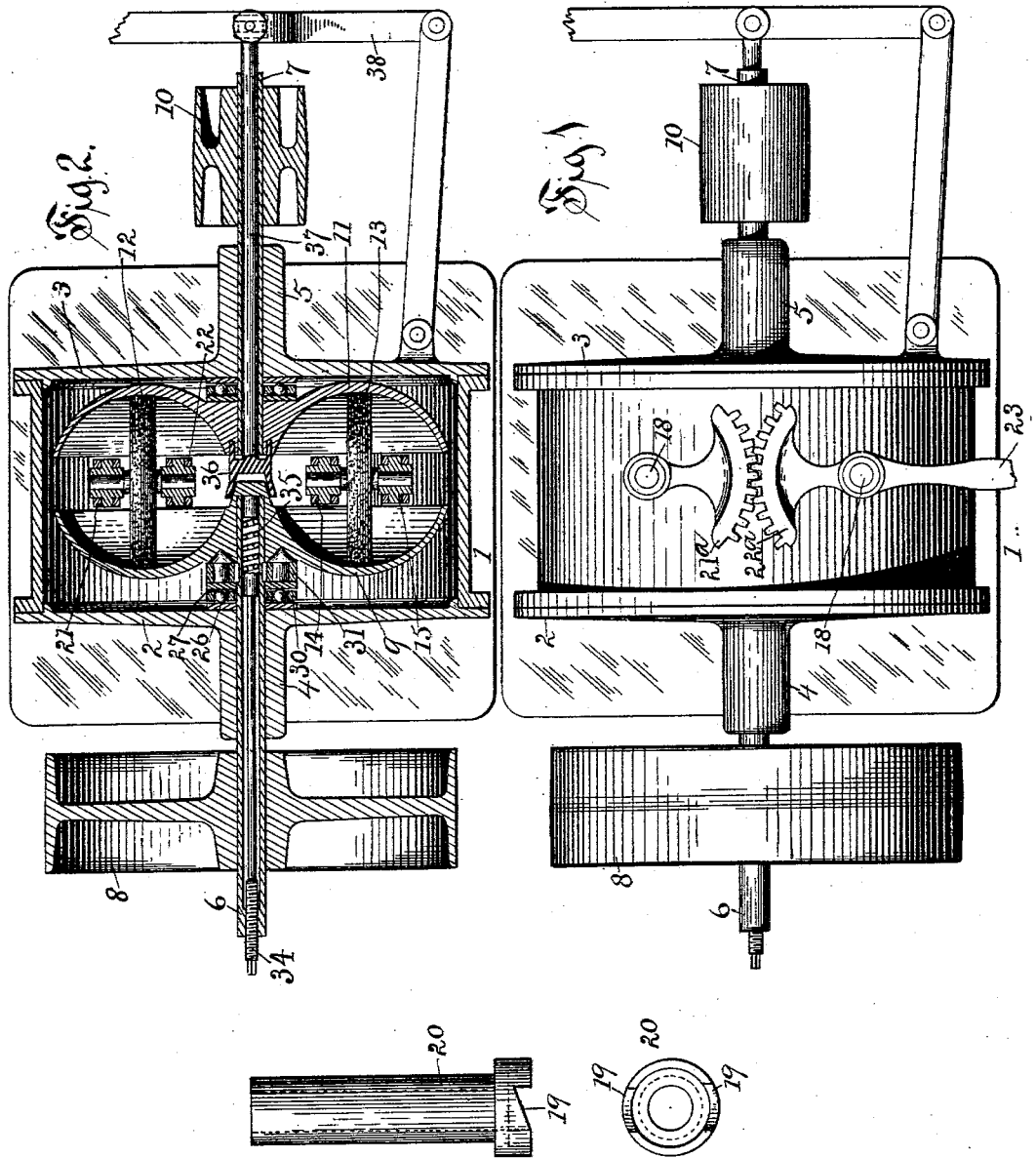
Witnesses:
Arthur B. Jenkins
Emma P. Coffrin
Inventor:
Ira H. Spencer
by Chas. L. Burdeā,
Attorney.

No. 751,958. PATENTED FEB. 9, 1904.
I. H. SPENCER.
VARIABLE SPEED DEVICE.
APPLICATION FILED SEPT. 12, 1902.
NO MODEL. 2 SHEETS—SHEET 2.

Witnesses:
Arthur B. Jenkins,
Emma P. Coffrin.

Inventor:
Ira H. Spencer,
by Chas. L. Burdett
Attorney.

No. 751,958. Patented February 9, 1904.

UNITED STATES PATENT OFFICE.

IRA H. SPENCER, OF HARTFORD, CONNECTICUT.

VARIABLE-SPEED DEVICE.

SPECIFICATION forming part of Letters Patent No. 751,958, dated February 9, 1904.

Application filed September 12, 1902. Serial No. 123,160. (No model.)

*To all whom it may concern:*

Be it known that I, IRA H. SPENCER, a citizen of the United States, and a resident of Hartford, in the county of Hartford and State of Connecticut, have invented certain new and useful Improvements in Variable-Speed Devices, of which the following is a full, clear, and exact description, whereby any one skilled in the art can make and use the same.

The invention relates to speed-changing mechanisms and to the special class of such devices in which the motion of a driving member is transmitted to a driven member through the medium of intermediate friction drive members, which intermediate members by their position determine the relative speed of the driving and driven members.

The objects of the invention are to provide a mechanism of the class specified in which the intermediate friction drive members may be readily controlled and moved into their various speed-changing positions; to provide an adjustment between the driving, driven, and the intermediate friction drive members whereby the pressure between the several members will be automatically varied, dependent upon the load upon the driven member; to provide an adjustable means for resiliently forcing the driving and driven parts into contact with the intermediate friction drive members, and to provide a reversing mechanism for changing at will the directional movement of the driven part.

A further object of the invention is to simplify the construction of a mechanism of the class specified and to provide bearings of special form which will take up all end thrusts with a minimum of friction.

Figure 5:
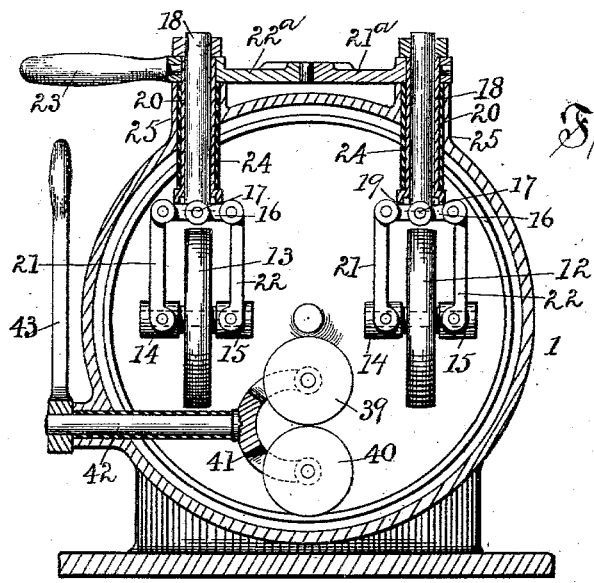
Figure 6:
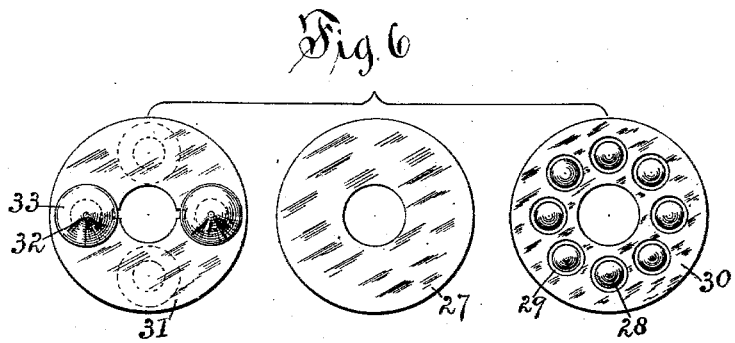
Figure 7:
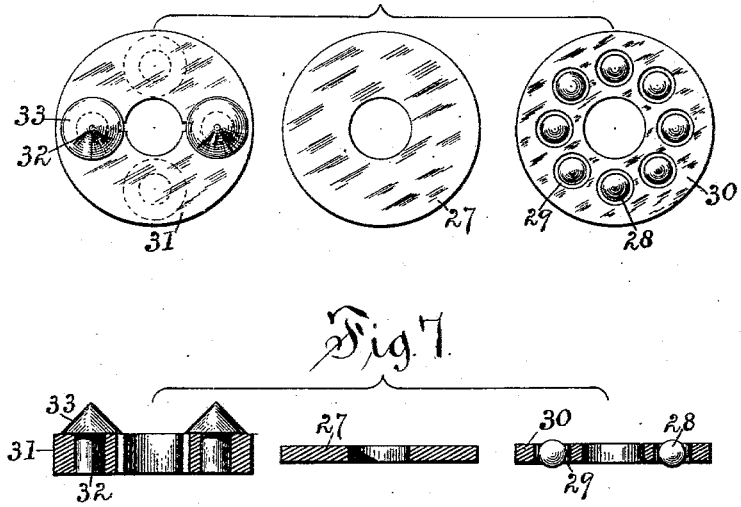

Referring to the drawings, Figure 1 is a plan view of a device embodying the invention. Fig. 2 is a horizontal sectional view of the mechanism shown in Fig. 1. Fig. 3 is a detail side view of the guide-cam and sleeve. Fig. 4 is a front face view of the cam of the cam-sleeve. Fig. 5 is a cross-sectional view through the mechanism on a line transverse to the axis of the driving and driven shafts, showing a modified form of reversing mechanism. Fig. 6 is a detail view, in enlarged scale, showing several of the parts of one of the thrust-bearings. Fig. 7 is a detail sectional view of the parts shown in Fig. 6, taken on a line passing centrally through each of said parts.

Referring to the drawings, the numeral 1 denotes a casing or support which in the present instance is provided with heads 2 3, which are so formed as to provide suitable bearings 4 5 for the driving-shaft 6 and driven shaft 7. The part 1 and heads 2 3 are so associated as to form an inclosing casing entirely enveloping the several working parts of the structure with obvious advantages, although the precise form of casing and manner of mounting the parts of the mechanism are not material so long as the advantages sought for are secured.

As shown in Figs. 1 and 2, the driving-shaft 6 is of tubular form and bears at its outer end a driving-pulley 8 and loose on its inner end, which extends within the casing, a friction drive-disk 9.

Arranged on the same axial line with the driving-shaft 6 is a driven shaft 7, which bears at its outer end a driven pulley 10 and at its inner end, securely keyed thereon, a driven friction-disk 11.

The two disks 9 and 11 are provided with oppositely-disposed concaved surfaces of annular form which coöperate with one or more friction-wheels 12 13, which form the intermediate friction drive members between the driving and driven shafts. The friction-wheels are mounted to have a tilting movement during which they may be easily moved into any of their several driving positions. These friction-wheels 12 13, as shown in Fig. 5 of the drawings, are mounted in suitable bearings 14 15, pivotally supported in frames of yoke form comprising bars 16, pivoted, as at 17, to a shaft 18, loosely supported in cam-sleeves 20 and dependent members 21 22, arranged upon opposite sides of the friction-wheels and pivoted to the bar 16 and bearings of the wheels. In fact, the supporting frames or yokes for the disks are warpable frames by which a tilting or rocking movement may be given to the friction-wheels.

The cam-sleeves 20 are provided at their inner ends with cam-surfaces 19, which bear upon the upper edges of the bars 16. At their upper ends these cam-sleeves 20 are secured to gear-segments 21ª 22ª, one of which is provided with an operating-handle 23. Spacing-sleeves 24 are provided between the gear-segments and a shoulder upon the cam-sleeves for maintaining the parts in proper position. The sleeves, cam-sleeves, and shafts for the friction-wheels are supported in bearings 25 formed in the casings.

It is of course apparent that with the arrangement of driving-disk, intermediate friction-wheels and driven disk the driving and driven members will rotate in opposite directions, and it is equally apparent that when the friction-wheels are in the position shown in Figs. 2 and 5 both the driving and driven members will rotate at the same speed. When the parts are in this position, it will be noted that the axes of the two friction-disks are in substantially the same axial line, and this line is transverse to the axis of the driving and driven shafts and practically at right angles thereto. In this position of the parts the several parts of the frames or yokes stand at right angles to each other, with the bars 16 parallel with the axis of the friction-disks.

Now if the handle 23 is moved in either direction the cams 19 upon the cam-sleeves 20 will bear against the bars 16 and tilt them with reference to the axes of their supporting-shafts 18, and this tilting of the bars will, through the pivoted members of the frame, cause the axes of the friction-wheels to be swung out of their normal positions, and thus the disks will be easily steered into any desired driving position by their own rotation between the driving and driven disks. The normal driving positions of the friction-wheels are such that their axes are at right angles to the axes of the supporting-shafts 18, and as soon as they are tilted out of this position they will run into a new driving position in one direction or the other, dependent upon the direction in which they are tilted. Ordinarily in devices of this class the friction-wheels have been moved to their several driving positions by turning them between the friction-disks while their axes are held in the same plane, and as the friction-disks bear with considerable force upon opposite sides of the friction-wheels it is often difficult to change the position of said wheels, as of course the wheels must be moved over the surface of the driving and driven disks in a line transverse to their plane of rotation. In the device herein shown this trouble is obviated, and by first swinging or tilting the friction-wheels on an axis passing through their axes and points of contacts with the driving and driven disks the wheels will, owing to their direction of rotation, easily follow and be driven into a new position with relation to the driving and driven members.

In Figs. 3 and 4 the cam-sleeve and cam are shown in enlarged scale. There are two cam-surfaces 19 formed in the cylindrical end of the cam-sleeve 20, and these cam-surfaces are opposed to each other. These two cam-surfaces rest upon the bar 16 and at opposite sides of its pivot 17. By this arrangement if the handle 23 is moved and the axes of the friction-wheels 12 13 are tilted out of their normal position the wheels will be steered into a new position without liability of their turning too far, for one of the cam-surfaces will always coöperate with the other to prevent excessive movement.

In order to prevent the wheel from moving toward the center or periphery of the disks, it is essential that the plane of rotation of the wheel shall be tangential to a circle described by the point of contact of the wheel with the disk in the rotation of the latter. If the wheel is tipped to the minutest degree out of such position, it will travel on the disk in that direction in which it is inclined, the rate of travel being proportioned to the degree in which it is tipped out of the position described. In order to obviate this traveling of the disk and hold it in a position once attained, it is essential that some device be employed for locating the wheel, so that its plane of rotation will be tangential to a circle described by the point of contact of the wheel with the disk in the rotation of the latter.

Both the driving and driven friction-disks are backed up with antifriction thrust-bearings comprising hardened bearing-plates 26 27, between which are arranged balls 28, carried in perforations 29 in a plate 30. This plate is of less thickness than the diameter of the balls.

Between the driving-disk and its thrust-bearings is located a collar 31, keyed to the driving-shaft 6. This collar is provided with one or more studs 32, having conical heads 33, normally resting within conical depressions in the driving friction-disk 9. As the disk 9 is loosely mounted upon the shaft 6 and the collar bearing the conical studs is keyed to said shaft, it might be said the conical studs form a clutch between the disk 9 and shaft 6. An adjustable plunger 34 is arranged within the tubular shaft 6 and bears at its inner end against a spring or cushion 35, which bears against the friction-disk 9 at or near its center and forces it into contact with the friction-wheels 12 13. By this arrangement the friction-disks and their intermediate friction-wheels are held in frictional contact by a forced yielding pressure, which is adjusted for driving all ordinary loads and at ordinary speeds. If the load or speed is suddenly increased, there will of course be a tendency of the parts to slip, and it is necessary to then increase the pressure between the several parts in order to secure the proper driving effect. This may be done by adjusting the plunger 34, though the clutch between the driving-disk 9 and its shaft is designed to automatically increase the pressure between the parts. It is apparent that with the mechanism in operation as soon as there is an undue resistance put upon the driven shaft tending to retard its movement the driving-disk 9 will tend to run slower than its shaft, and thereupon the conical recesses of the disk 9 and the coöperating conical studs forming the clutch will be displaced, the conical studs bearing against the walls of the conical recesses and forcing the friction-disk 9 into close contact with the friction-wheels 12 13.

In Figs. 1 and 2 there is shown one form of reversing mechanism for changing the direction of rotation of the driven shaft. This consists of a clutch 36, interposed between the driving and driven disks and controlled by a rod 37, passing through the tubular driven shaft 7 and actuated by a pivoted lever 38. Ordinarily the disks 9 and 11 rotate in opposite directions owing to the intermediate friction-wheels, and thus when the clutch 36 is thrown in, forcing the disk 9 away from the friction-wheels, the two disks 9 11 will be clutched together and will both rotate in the direction of the driving member.

In Fig. 5 there is shown a modified form of reversing mechanism comprising two intermediate friction-wheels 39 40 in contact with each other and carried in a yoke 41, provided with suitable bearings and an operating shaft and lever 42 43 by which the wheels 39 and 40 may be thrown into contact with the driving and driven disks. The friction-wheels 39 40 may be swung about their supporting-axes and their position of contact with the driving and driven disks may be varied to vary the relative speed of said disks. It is obvious that by using two intermediate friction-wheels the direction of rotation of the driven disk will be in the opposite direction to that when a single friction-wheel is used.

It is obvious that the details of the mechanism herein shown might be varied to a great degree without in any way departing from the spirit of the invention, and various arrangements of parts are contemplated with necessary and apparent changes in details of said parts which still embody the essential features of invention herein set forth.

What I claim as my invention, and desire to secure by Letters Patent, is—

1. A driving-disk, a driven disk, an intermediate friction drive member, means for tilting the axis of said friction drive member, said means reacting through self-induced action of the driving parts to retain the friction drive member in predetermined positions.

2. A driving-disk, a driven disk, an intermediate friction drive member, a tilting frame supporting said friction drive member and means for tilting the frame, said means including mechanism which coöperating with the self-induced action of the driving members will move said friction drive member to and retain it in predetermined positions.

3. A driving-disk, a driven disk, an intermediate friction drive member and means for tilting the axis of said intermediate drive member while the parts are in motion, said means including mechanism coöperating with the self-induced action of the driving member whereby said driving member assumes and retains predetermined positions with reference to the driving and driven disks.

4. A driving-disk, a driven disk, a friction drive member supported between said disks, means for tilting the axis of said disk, and means for causing said disk to assume and retain a predetermined position with its plane of rotation tangent to a circle described by the point of contact of the disk with the drive member in the rotation of the latter.

5. A driving-disk, a driven disk, a friction drive member supported between said disks, means for tilting the axis of the drive member and self-actuated means for positioning said drive member, means for controlling the movement of said drive member whereby it will assume a predetermined position tangent to a circle described by the point of contact of the driving member with the disk in the rotation of the latter.

6. A driving-disk, a driven disk, a tilting frame located between said disks, an intermediate friction drive member supported on said tilting frame, means for tilting the frame, and means for holding the frame in position with the plane of rotation of the friction drive member tangent to the circle described by the point of contact of said member with the driving-disk in the rotation of the latter, said means coacting with the driving action of the members to return the frame to a normal position.

7. A driving-disk, a driven disk, a tilting frame located between said disks, means for tilting the frame and self-actuated means for controlling the movements of the frame whereby it will assume a position with the plane of rotation of the drive member tangent to a circle described by the point of contact of said drive member with the driving-disk in the rotation of the latter.

8. A driving-disk, a driven disk, a shaft supporting a tilting bar, the bar mounted on said shaft and intermediate friction drive member supported by said bar and means for tilting said bar, said means including mechanism which coöperates with the self-induced action of the intermedate drive member and controls the movement of the tilting bar whereby it will assume a predetermined position with the plane of rotation of the friction drive member tangent to the circle described by the point of contact of the said friction member with the driving-disk in the rotation of the latter.

9. A driving-disk, a driven disk, a friction drive member supported between said disks, and a cam arranged to tilt the axis of the friction drive member.

10. A driving-disk, a driven disk, a friction drive member supported between said disks, and a cam for tilting the axis of said friction drive member and for causing it to assume a position with its plane of rotation tangent to the circle described by its point of contact with the driving-disk in the rotation of the latter.

11. A driving-disk, a driven disk, a tilting frame supported between said disks, a friction drive member supported on the tilting frame, and a cam for tilting said frame and for controlling the movement of the frame whereby it will through self-induced action assume a position with the plane of rotation of the friction drive member tangent to a circle described by the point of contact of the drive member with the driving-disk in the rotation of the latter.

12. A driving-disk, a driven disk, a tilting bar supported between said disks, a friction drive member supported by said tilting bar and a cam engaging said bar on the opposite sides of its pivotal support.

13. A driving-disk, a driven disk, a tilting bar, a friction drive member supported by the tilting bar between said disks, and a cam engaging said bar on opposite sides of its pivotal support and arranged to control its movement whereby it will through self-induced action assume a position with the plane of rotation of the drive member tangent to a circle described by the point of contact of said drive member with the driving-disk in the rotation of the latter.

14. In a change-speed mechanism in combination, a driving-disk, a driven disk, a shaft supporting a tilting bar, a bar mounted on said shaft, an intermediate friction drive member mounted on the bar, a cam in contact with said bar and means for rotating the said shaft.

15. In combination in a change-speed mechanism, a driving-shaft, a disk on said shaft, an independent driven shaft and a disk thereon, an intermediate friction drive member, and mechanism located between a disk and its shaft whereby the grasping pressure of the disks upon the intermediate friction drive member is automatically changed.

16. In combination in a change-speed mechanism, a driving-shaft, a disk on said shaft and having a ring-shaped recess in its face, a driven disk having a corresponding recess in its face, an intermediate friction drive-wheel, and automatic stress devices located between a disk and its supporting-shaft.

17. In combination in a change-speed mechanism, a driving-shaft, a disk on said shaft, a driven disk and its supporting-shaft, an intermediate friction drive-wheel, a clutch device back of one of the disks and comprising conical-headed pins borne on a disk fast to the shaft and corresponding recesses formed in the back of the disk, and means for tilting the axis of the intermediate drive member.

18. In combination in a change-speed mechanism, a tubular driving-shaft, a disk mounted on said shaft and having a ring-shaped recess of circular cross-section on a radial line, a driven shaft supporting a corresponding disk located in opposition to the first-named disk and having a like ring-shaped recess, the corresponding disk, two intermediate friction drive-wheels located between said disks on opposite sides of the axis of the shafts supporting said disks, jointed supports for each drive-wheel supported on a tilting bar pivoted to a spindle, the tilting bar, the spindle, sleeves surrounding the spindles and having on their inner ends cams in contact with the tilting bars, coupling devices uniting the cam-sleeves, and means whereby a rotary movement imparted to one cam-sleeve is communicated to a like degree to the other cam-sleeve appurtenant to the other drive-wheel whereby the movement and position of the drive-wheels is determined and controlled by a positive and self-induced action.

19. A driving-disk, a driven disk, friction driving members supported between said disks, means for imparting simultaneous tipping movement to the axes of said friction drive members, and means whereby a self-induced action will control the tipping movement of the axes whereby they will assume and retain various predetermined driving positions.

20. A driving-disk, a driven disk, friction drive members supported between said disks, means for imparting simultaneous tilting movement to the axes of said friction drive members, and means for controlling said members whereby they will through self-induced action assume a position with their planes of rotation tangent to a point described by the contact of said members with the driving-disk in the rotation of the latter.

21. A driving-disk, a driven disk, friction drive members supported between said disks, means for simultaneously tipping the axes of said members, and means for controlling said members whereby they will through self-induced action assume a position with their planes of rotation tangent to a circle described by the points of contact of the members with the driving-disk in the rotation of the latter.

22. A driving-disk, a driven disk, friction drive members supported between said disks, means for tilting the axes of said drive members, and connections between said tilting members for causing them to act simultaneously.

23. A driving-disk, a driven disk, friction drive members supported between said disks, a tilting bar supporting each of the friction drive members, means for tilting the bars, and connections between said tilting means for causing their simultaneous action.

24. A driving-disk, a driven disk, friction drive members supported between said disks, cams for tilting the axes of said disks, and connections between said cams for causing their simultaneous action.

25. A driving-disk, a driven disk, friction drive members supported between said disks, tilting bars supporting said friction drive members, cams for tilting said bars, and connections between said cams for causing their simultaneous action.

26. In combination in a change-speed mechanism, a driving-shaft, a driving-disk on said shaft, a driven disk, an intermediate friction drive-wheel, and automatic stress devices located between a disk and its supporting-shaft.

27. In combination in a change-speed mechanism, a driving-shaft, a driving-disk on said shaft, a driven disk and its supporting-shaft, an intermediate friction drive-wheel, a clutch device upon one of said disks and its shaft and comprising conical-headed pins borne on one part engaging corresponding recesses formed in the opposite part.

28. In combination in a change-speed mechanism, a driving-shaft, a driving-disk mounted on said shaft, a driven shaft, a driven disk supported on said shaft, friction drive-wheels supported between said disks, a yielding support located back of one of said disks, and a coupling device appurtenant to the opposite disk for coupling said disks together.

29. In combination in a change-speed mechanism, a driving-shaft, a disk mounted on said shaft, a driven shaft, a disk mounted on the driven shaft, a friction drive-wheel supported between said disks, a yielding support mounted back of one of said disks, reversing mechanism also mounted upon the disks, and means for operating the reversing mechanism.

30. In combination in a change-speed mechanism, a driving-shaft, a driving-disk on said shaft, a driven disk, an intermediate friction drive-wheel, means for tipping the axis of said drive-wheel, and automatic stress devices located between a disk and its supporting-shaft.

31. In combination in a change-speed mechanism, a driving-shaft, a driving-disk on said shaft, a driven disk and its supporting-shaft, an intermediate friction drive-wheel, means for tipping the axis of said drive-wheel, a clutch device upon one of said disks and its shaft and comprising conical-headed pins borne on one part engaging corresponding recesses formed in the opposite part.

32. In combination in a change-speed mechanism, a driving-shaft, a driving-disk mounted on said shaft, a driven shaft, a driven disk supported on said shaft, a friction drive-wheel supported between said disks, means for tipping the axis of said drive-wheel, a yielding support located back of one of said disks, and a coupling device appurtenant to the opposite disk for coupling said disks together.

33. In combination in a change-speed mechanism, a driving-shaft, a disk mounted on said shaft, a driven shaft, a disk mounted on the driven shaft, a friction drive-wheel supported between said disks, means for tipping the axis of said drive-wheel, a yielding support mounted back of one of said disks, reversing mechanism also mounted between the disks, and means for operating the reversing mechanism.

34. A driving-disk, a driven disk, a friction drive member supported between said disks, means for tilting the axis of the friction drive member, and self-induced means for controlling the tilting action of said disk.

35. A driving-disk, a driven disk, a friction drive member supported between said disks, means for tilting and controlling the tilting movement of the axis of the friction drive member, and a stress device adapted to increase the pressure between the driving and driven disks dependent upon the resistance of the driven disk.

36. A driving-disk, a driven disk, a friction drive member supported between said disks, means for tilting the axis of the friction drive member, and a coupling for uniting the driving and driven disks whereby their direction of rotation may be changed.

37. A driving-disk, a driven disk, a friction drive member supported between said disks, means for varying the position of the drive member with reference to the disks and means intermediate said disks adapted for clutching and releasing action with relation thereto whereby the same or opposite directions of rotation may be maintained between the driving and driven disks.

IRA H. SPENCER.

Witnesses:
ARTHUR B. JENKINS,
ERMA P. COFFRIN.